United States Patent
Zucker

(10) Patent No.: US 11,675,088 B2
(45) Date of Patent: Jun. 13, 2023

(54) PHASE CENTRE COMPENSATION FOR HIGH PRECISION GNSS ANTENNAS

(71) Applicant: Harman Becker Automotive Systems GmbH, Karlsbad (DE)

(72) Inventor: Friedhelm Zucker, Villingen-Schwenningen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 203 days.

(21) Appl. No.: 17/295,824

(22) PCT Filed: Nov. 30, 2018

(86) PCT No.: PCT/EP2018/083237
§ 371 (c)(1),
(2) Date: May 20, 2021

(87) PCT Pub. No.: WO2020/108782
PCT Pub. Date: Jun. 4, 2020

(65) Prior Publication Data
US 2022/0026581 A1 Jan. 27, 2022

(51) Int. Cl.
*G01S 19/23* (2010.01)
*G01S 19/36* (2010.01)

(52) U.S. Cl.
CPC ............. *G01S 19/23* (2013.01); *G01S 19/36* (2013.01)

(58) Field of Classification Search
CPC ................................ G01S 19/36; G01S 19/23
USPC ...................................................... 342/357.62
See application file for complete search history.

(56) References Cited

U.S. PATENT DOCUMENTS

| 5,296,861 A * | 3/1994 | Knight ...................... G01S 3/46 342/357.38 |
| 2011/0050497 A1 | 3/2011 | Maenpa et al. |
| 2013/0241768 A1 | 9/2013 | Petersen |
| 2016/0170030 A1* | 6/2016 | Dolgin ................. G01C 21/165 701/470 |

(Continued)

FOREIGN PATENT DOCUMENTS

CA    2777803 A1 *  4/2011  ............. G01S 19/54

OTHER PUBLICATIONS

Zhu, S. et al., "Satellite antenna phase center offsets and scale errors in GPS solutions," Journal of Geodesy, vol. 76, No. 11-12, Mar. 1, 2003, 5 pages.

(Continued)

*Primary Examiner* — Harry K Liu
(74) *Attorney, Agent, or Firm* — McCoy Russell LLP

(57) ABSTRACT

A method for determining a position of a phase centre of an antenna arranged in a mobile device, in particular a vehicle, wherein the antenna is operable to receive satellite signals in a global navigation satellite system, the method comprising: receiving, with the antenna, satellite signals from satellites of the global navigation satellite system; determining a direction from which the satellite signals are received based on the received satellite signals; and determining the position of the phase centre of the antenna based on the direction from which the satellite signals are received and stored correlation information indicative of a correlation between the position of the phase centre and the direction from which the satellite signals are received.

20 Claims, 5 Drawing Sheets

(56) References Cited

U.S. PATENT DOCUMENTS

2018/0288627 A1* 10/2018 Ellum .................. H01Q 25/002

OTHER PUBLICATIONS

ISA European Patent Office, International Search Report Issued in Application No. PCT/EP2018/083237, dated Sep. 25, 2019, WIPO, 2 pages.

* cited by examiner

PHASE CENTRE COMPENSATION FOR HIGH PRECISION GNSS ANTENNAS

CROSS-REFERENCE TO RELATED APPLICATIONS

The present application is a U.S. National Phase of International Patent Application Serial No. PCT/EP2018/083237 entitled "PHASE CENTRE COMPENSATION FOR HIGH PRECISION GNSS ANTENNAS," and filed on Nov. 30, 2018. The entire contents of the above-referenced application is hereby incorporated by reference for all purposes.

BACKGROUND OF THE INVENTION

Today, many mobile devices, including vehicles, use satellite signals from a global navigation satellite system, GNSS, to determine their position. To do so, signals from multiple satellites are received with an antenna of the mobile device and are subsequently decoded by a receiver. Based on the received satellite signals, the receiver determines the location of the antenna. High precision GNSS systems are able to determine the vehicle antenna's position with accuracies in the range of centimetres or millimetres. For that purpose, known high precision GNSS systems require antennas with stable phase centres. The phase centre of the antenna is the point, where the conversion from received wave to the electrical signals seems to take place. The phase centre is, however, depending on the direction from where the incoming wave hits the antenna structure. Ideally, this point should be independent of the direction of the incoming wave, such that it may be considered as the antenna's position within the GNSS. Otherwise, the phase centre associated with the signal received from only one satellite, or an average phase centre taking into account multiple received satellite signals, may be regarded as the position of the antenna. That leads, however, to an imprecise and unstable determination of the antenna's position.

Usually, antenna's fulfilling the specification of a relatively stable phase centre are often too bulky and expensive to be used in a customary manufacturing process. This leads to the usage of antenna designs not fulfilling the requested performance. It is, however, desirable to still achieve high positioning accuracy despite the imperfection behaviour, i.e. the unstable phase centre of the antenna.

SUMMARY

According to one of many embodiments, there is provided a method for compensating an offset of a position of a phase centre of an antenna with respect to a geometric position of the antenna arranged in a mobile device, in particular a vehicle, wherein the antenna is operable to receive satellite signals in a global navigation satellite system, the method comprising: receiving, with the antenna, satellite signals from satellites of the global navigation satellite system; determining a direction from which the satellite signals are received based on the received satellite signals; determining the offset based on the direction from which the satellite signals are received and stored correlation information indicative of a correlation between the position of the phase centre and the direction from which the satellite signals are received.

The above described method is based on the realisation that the phase centre of an antenna depends on the direction from which the satellite signals are received. This holds particular true for antennas with relatively unstable phase centres, such as antennas used in relatively simple and inexpensive position determining devises. By taking into account the direction from which the satellite signals are received by a mobile antenna, i.e. an antenna without a fixed orientation in the global navigation satellite system, the accuracy of the determined phase centre is increased. In particular, relatively simple position determining devises are enabled to determine the position of the antenna in a highly accurate manner.

According to an embodiment, determining the offset is further based on the frequency of the received satellite signals and the stored correlation information is further indicative of a correlation between the phase centre and the frequency of the received satellite signals.

The phase centre of the antenna may also vary depending on the frequency of the received satellite signals. Thus, the consideration of the satellite signal frequency further increases the accuracy of the determined position of the antenna.

According to an embodiment, the method further comprises determining an orientation of the antenna relative to the satellites; wherein determining the direction from which the satellite signals are received is based on the determined orientation of the antenna.

Thereby, it is taken into account that the mobile antenna may not only perform translational movements but may rotate around different axis. Rotational movement of the antenna may lead to a change in direction from which the satellite signal is received. As the mobile antenna may not be rotationally symmetric, considering said rotational movement further increases the accuracy of the determined phase centre.

According to an embodiment the orientation of the antenna is determined by an orientation determining device, in particular an orientation determining device arranged in the vehicle.

The orientation determination device, such as an inertial measurement unit, IMU, and/or a GPS device, may accurately indicate an orientation of the mobile device or vehicle, in particular independently of the received satellite signals and may therefore be used to derive the orientation of the antenna arranged in or mounted at the mobile device or vehicle. Thereby, the reliability and accuracy of the determined direction from which the satellite signals are received is increased.

According to an embodiment the orientation of the antenna is determined and stored repeatedly, in particular periodically, or continuously.

Consequently, data specifying the present orientation of the antenna is immediately available to the method when receiving satellite signals. Thus, the time required to determine the position of the vehicle is decreased.

According to an embodiment, the method further comprises determining and storing, prior to receiving the satellite signals, the correlation information based on reference signals received from one or more reference directions at a reference geometric position of the antenna.

The determination of the correlation information may be performed in a laboratory environment where the geometric position and the orientation of the antenna is well known i.e. is known with a desirable accuracy. The reference satellite signal may be a signal received from an entity imitating a reference satellite in the laboratory environment. The positon of said entity may also be known with a desirable accuracy. Thus, determining the phase centre of the antenna using different known directions relative to the antenna's orientation from which the reference satellite signal is received and comparing the determined phase centre with the known geometric position of the antenna, leads to an accurate determination of an offset between the determined phase centre of the antenna and the actual geometric position of the antenna associated with each of the different known directions respectively.

According to an embodiment, determining the correlation information is further based on one or more frequencies of the received reference signals.

As pointed out above, the frequency of the received reference satellite signal may have a significant effect on the offset of the phase centre of the antenna to the geometric position. Considering the frequency of the received reference satellite signal increases the quality of the stored information and, thus, the accuracy of the determined phase centre.

According to an embodiment, determining the correlation information comprises receiving, with the antenna, the satellite signals as the reference signals; determining a position of a reference phase centre of the antenna based on the received reference satellite signals; obtaining the reference geometric position of the antenna; comparing the determined reference phase centre with the obtained reference geometric position.

Accordingly, the determination of the correlation information can be performed in reference areas, rather than in a laboratory environment, whilst receiving satellite signals of available satellites. Within the reference area, the geometric position of the antenna may be well known or may be determined using positioning methods other than a method based on satellite signals. That is to say that the correlation information can be determined, while the antenna or, e.g., the vehicle is in use. Therefore, a database containing the correlation information can be regularly updated, thereby increasing the amount of stored correlation information or improving the quality or accuracy of the correlation information and, consequently, improving the accuracy of the determined phase centre.

According to another embodiment, there is provided a positioning system comprising a mobile antenna operable to receive satellite signals in a global navigation satellite system, the positioning system being configured to carry out the method according to any of the preceding claims.

BRIEF DESCRIPTION OF THE DRAWINGS

The present invention may be better understood from reading the following description of non-limiting embodiments, with reference to the attached drawings, wherein.

DETAILED DESCRIPTION OF THE FIGURES

Figure 1:
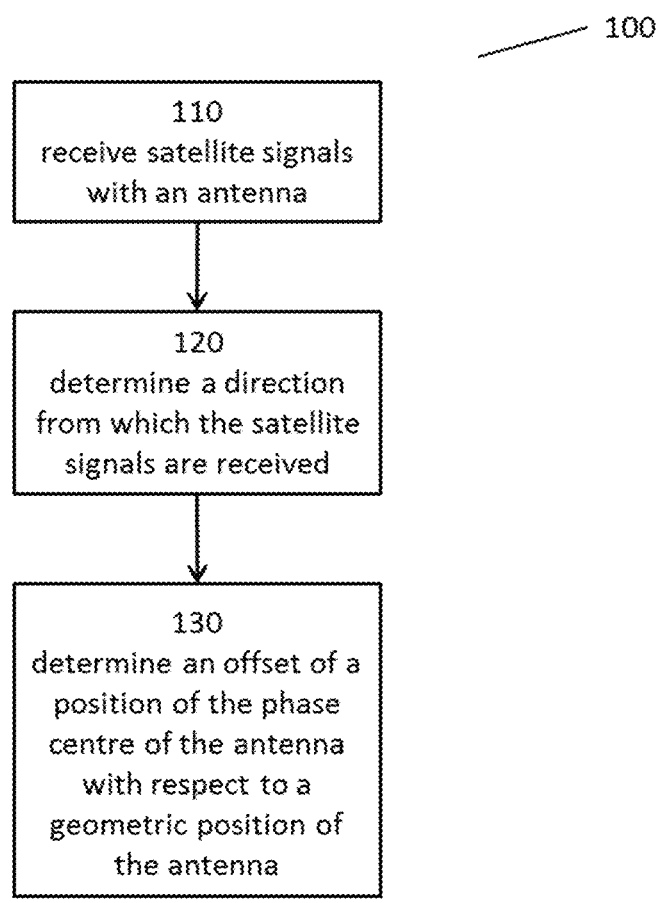
FIG. 1 shows a flowchart of a method for compensating an offset of a position of a phase centre of an antenna with respect to a geometric position of the antenna arranged in a mobile device.

FIG. 1 shows a flowchart of a method 100 for compensating an offset of a position of a phase centre of an antenna with respect to a geometric position of the antenna arranged in a mobile device. In the present example, the mobile device is a vehicle. Alternatively, the mobile device may be a mobile phone or any other mobile electronic device.

In step 110, satellite signals are received with the antenna arranged in the vehicle. The satellite signals may be received from multiple satellites of a global navigation satellite system, GNSS.

In step 120, a direction from which the satellite signals are received is determined based at least in part on the received satellite signals. In particular, a respective direction may be determined for one, multiple or each of the received satellite signals. The direction is determined relative to the antenna, i.e. relative to the vehicle that comprises the antenna. The determined direction may be a vector indicative of an azimuth and/or an elevation angle with respect to an orientation of the antenna. Thus, in a constellation where the position of the satellites from which the satellite signals are received remains constant and the position or orientation of the vehicle relative to the satellites changes, the direction, i.e. the azimuth and elevation angles from which the satellite signals are received changes as well. The determination of the direction may be performed by a receiver comprised in the vehicle. An exemplary method for determining the direction is described in more detail below with reference to FIG. 2.

In step 130, a position of the phase centre of the antenna associated with the received satellite signals, is determined. In particular, a position of the phase centre associated with one or some of the received satellite signals is determined. More particularly, an offset of a position of the phase centre of the antenna with respect to a geometric position of the antenna is determined. The determination of the position or the offset of the phase centre is based on the determined direction from which the satellite signals are received.

The determination of the position of the phase centre is further based on correlation information stored in storage means of the vehicle or stored in storage means accessible by the vehicle. The storage means accessible by vehicle may represent a server wirelessly coupled to the vehicle. The correlation information comprises an indication of the correlation between the position of the phase centre of the antenna and the direction from which the associated one or more satellite signals are received. The correlation information may, for example, indicate a shift or offset of the phase centre relative to a geometric centre of the antenna, or any other geometric position of the antenna, in dependence of the direction from which the one or more satellite signals are received. The correlation information may comprise compensation values for compensating the shift or offset of the phase centre relative to the geometric centre. The compensation values may be vectors comprising multiple components to compensate a three-dimensional shift or offset.

Thereby, the dependency of the position or the offset of the phase centre of the antenna on the direction from which the satellite signals are received relative to the antenna is taken into account and compensated. Thus, the position of the antenna, i.e. the position the vehicle in the GNSS can be determined in a precise manner.

Besides the direction from which the satellite signals are received, the position or the offset of the phase centre of the antenna may also be dependent on the frequency of the received satellite signals. Therefore, the correlation information may further indicate the dependency of the position or the offset of the phase centre on the frequency of the received satellite signals. Accordingly, the determination of the position or the offset of the phase centre associated with the received satellite signals may further be based on a determined frequency of the received satellite signals.

Figure 2:
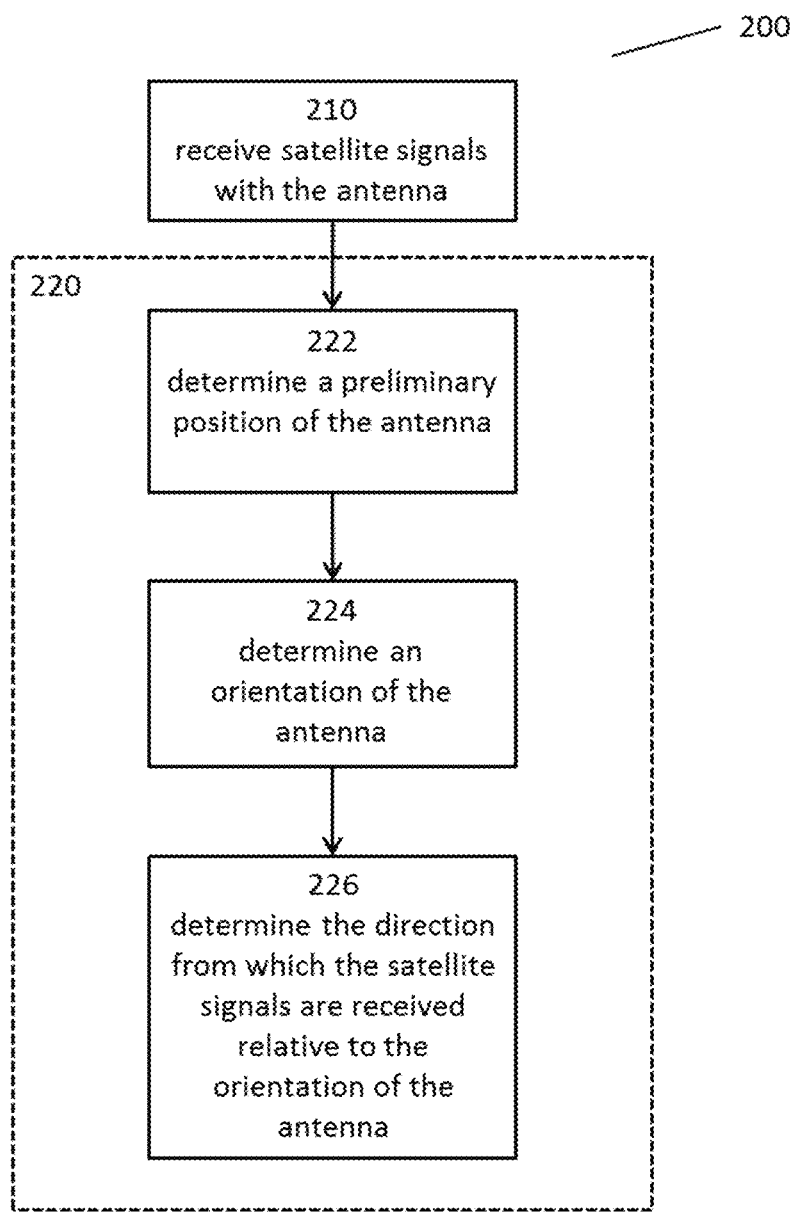
FIG. 2 shows a flowchart of a method for determining the direction from which satellite signals are received.

FIG. 2 shows a flowchart of an exemplary method 200 for determining the direction from which the satellite signals are received. In FIG. 2, steps 210 and 220 correspond to steps 110 and 120 of the method 100 illustrated in FIG. 1.

In step 210, satellite signals are received with the antenna. Based on the received satellite signals, the direction from which the satellite signals are received is determined in step 220. Step 220, in turn, comprises several sub-steps.

In sub-step 222, a preliminary position of the antenna is determined. The preliminary position may be determined based on the received satellite signals. For example, in step 210, satellite signals from multiple satellites, in particular from at least three satellites of the GNSS are received. The received satellite signals may indicate the position of each of the multiple satellites as well as the distance between each of the multiple satellites and the position of the antenna. The distance between the satellites and the position of the antenna may be derived from the time between transmittance of the signal by the satellites and the receipt of the signal by the antenna, i.e. of from the time of flight of the received signal. Based on the respective positions of the multiple satellites and the respective distances to the multiple satellites, the preliminary position of the antenna can be determined. In particular, a preliminary geometric position of the antenna or a preliminary position of the vehicle within the GNSS can be determined.

In sub-step 224, an orientation of the antenna relative to the satellites from which the satellite signals are received is determined. The orientation of the antenna may represent a fixed direction relative to the antenna or the vehicle. The orientation of the antenna may be defined by a vector orthogonal to a longitudinal extension of the antenna. The vector may always point in the driving direction of the vehicle. That is to say that the orientation of the antenna relative to the satellites changes if the antenna rotates around one or more independent axis of rotation. In one example, the orientation of the antenna changes when the vehicle is placed on a plane surface and rotates around a rotation axis perpendicular to the plane surface. In another example, the orientation of the antenna changes if the vehicle rotates around a rotation axis parallel to the plane surface, i.e. when the antenna is inclined relative to the plane surface. The other example may include situations where the vehicle drives up or down or parallel to a slope.

The orientation of the antenna may be determined by an orientation determining device, such as a device comprising an inertial measurement unit, IMU, and or a global positioning system, GPS, device. The orientation determining device may be arranged in the vehicle. Additionally or alternatively, the orientation of the antenna may be derived from a movement of the vehicle based on recently determined positions of the vehicle. That is to say that the orientation of antenna or the vehicle may be determined based on received satellite signals or by other entities arranged in the vehicle.

In sub-step 226, the direction from which the satellite signals are received relative to the orientation of the antenna is determined based on the preliminary position of the antenna determined in step 222 and the orientation of the antenna determined in step 224.

From the determined preliminary position of the antenna, a preliminary direction from which the satellite signals are received may be determined. The preliminary direction may be represented by a vector pointing from the preliminary position to one of the satellites. In other words, the preliminary direction may determine the direction from which the satellite signals are received in a satellite coordinate system taking into account the positions of the satellites and the preliminary position of the antenna or the vehicle. Put in yet another way, the preliminary direction is independent of rotational movements of the antenna performed on the preliminary position.

From the determined orientation of the antenna, the direction from which the satellite signals are received may be determined in a vehicle coordinate system in which the orientation vector of the antenna always points in the same direction. That is, using the orientation of the antenna within the satellite coordinate system and the direction from which the satellite signals are received in the satellite coordinate system, the direction from which the satellite signals are received can be determined relative to the orientation of the antenna, i.e. relative to the vehicle coordinate system.

Figure 3:
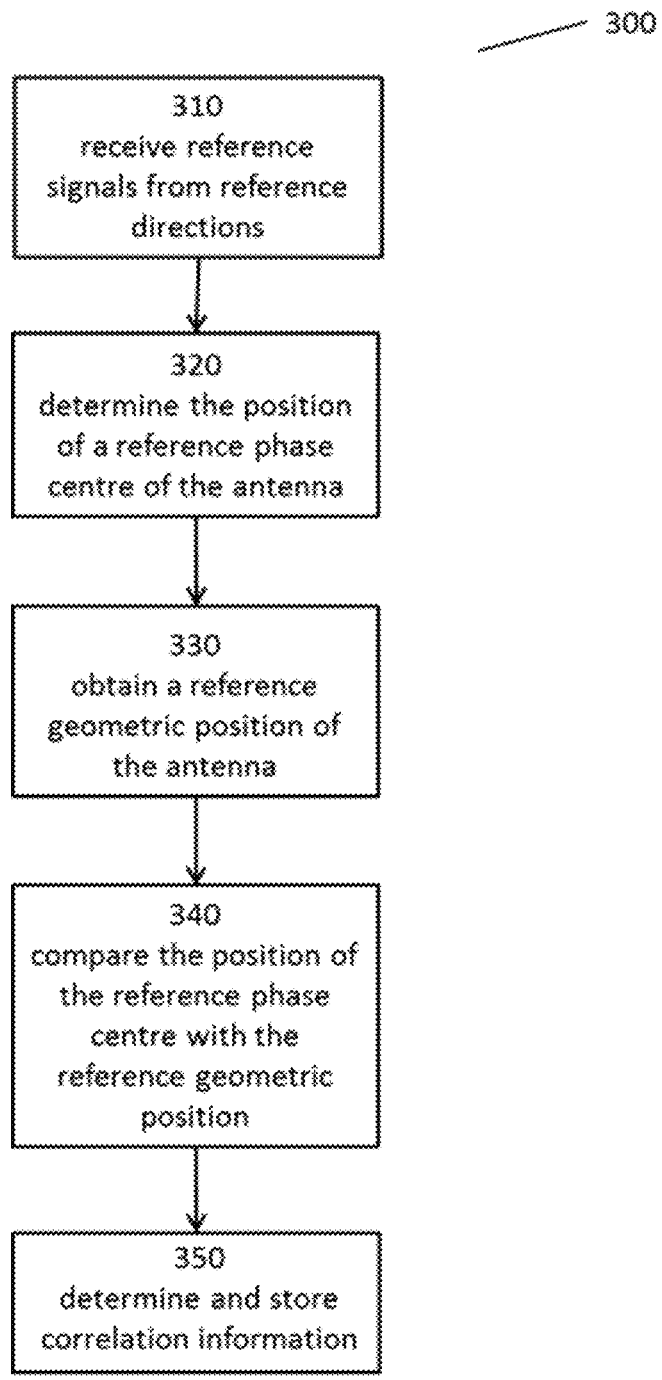
FIG. 3 shows a flowchart of a method for determining correlation information indicative of a correlation between the offset and the direction from which satellite signals are received.

FIG. 3 shows a flowchart of a method 300 for determining correlation information indicative of a correlation between the position or the offset of the phase centre and the direction from which satellite signals are received.

In step 310 one or more reference signals are received with the antenna from one or more reference directions. The reference signals may be received from satellites of the GNSS in a reference area. Alternatively, the reference signals may be received in a calibration environment during a calibration process. An example of a calibration environment is described in more detail below with reference to FIG. 4. The reference directions from which the reference signals are received in the reference area or the calibration environment as well as the frequency of the reference signals may be known. In particular, the positions of the transmitter of the reference signals as well as the position of the antenna may be known.

In step 320, the position of a reference phase centre associated with received reference signals is determined. In particular, the phase centre associated with one or multiple received reference signals is determined. As described above, the determined reference phase centre may not coincide with the position of the antenna.

In step 330, a reference position of the antenna is obtained. The reference position may be a geometric reference position such as the geometric centre of the antenna and may be derived from a reference position of the vehicle. The reference position of the antenna may be obtained from a reference positioning system that is configured to precisely determine the reference position of the antenna in the reference area, e.g. based on precise laser distance sensor data. Alternatively, the position of the antenna is a predetermined position in the calibration environment.

In step 314, the determined position of the reference phase centre is compared to the obtained reference position. Based on the comparison, the offset of the reference phase centre to the reference position of the antenna can be determined. In particular, the dependency of the position or the offset of the phase centre on the known direction from which the reference signals are received and the known frequency of the reference signals can be determined. Subsequently, correlation information indicative of the determined dependency is stored. Using the stored correlation information, the position of the phase centre or the offset can be determined based on received non-reference satellite signals, as described with reference to FIG. 1.

Figure 4:
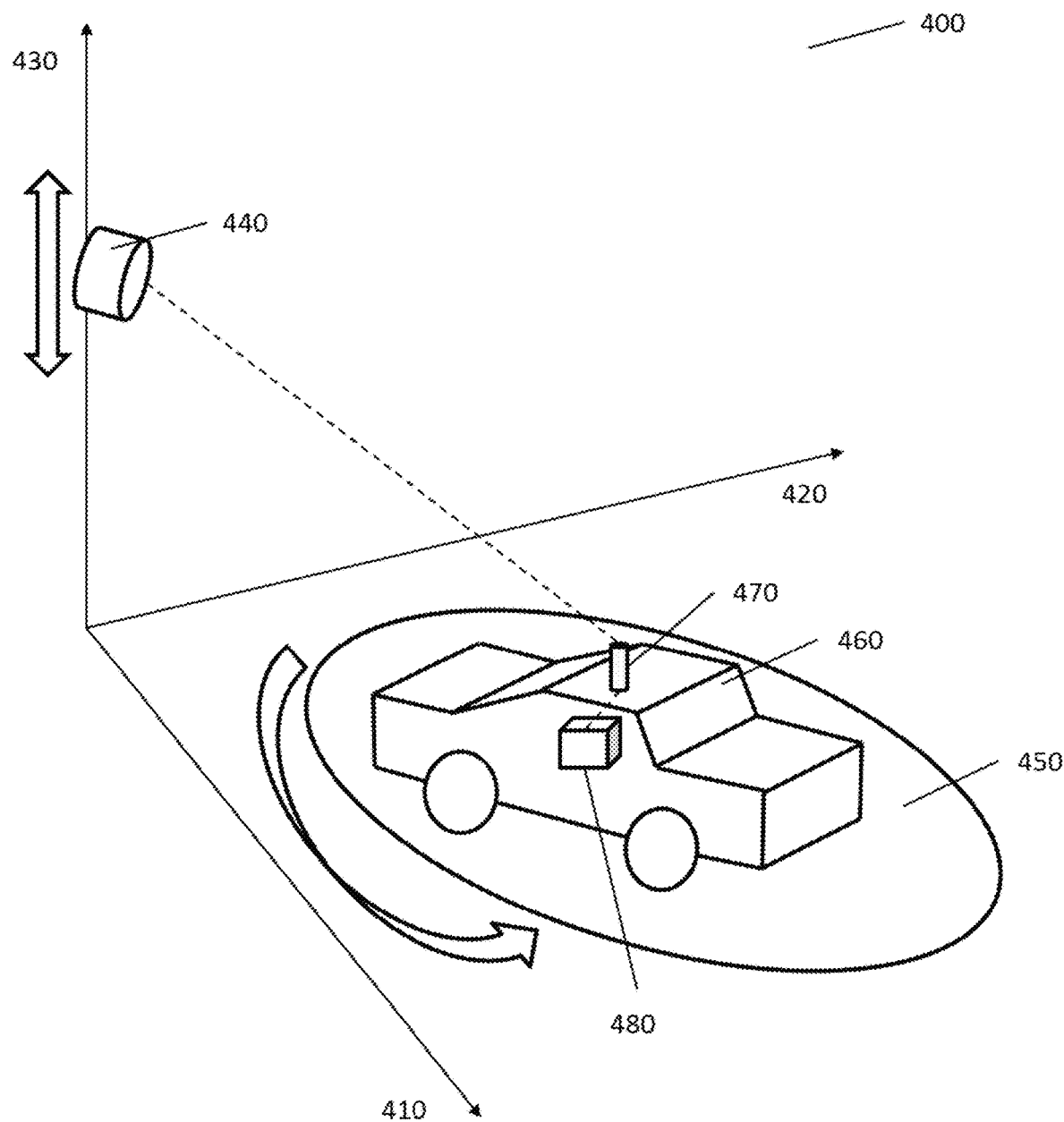
FIG. 4 shows a calibration environment for determining the correlation information.

FIG. 4 shows a calibration environment 400 comprising a reference signal transmitter 440, a rotatable platform 450, a vehicle 460 comprising an antenna 470 placed on the rotatable platform 450. The rotatable platform 450 is arranged parallel to a horizontal plane defined by independent first and second coordinate system axes 410 and 420. The rotatable platform 450 is rotatable around a rotation axis orthogonal to the horizontal plane. The rotation axis may comprise the geometric centre of the rotatable platform and/or the geometric centre of the antenna 470. The rotational platform may further be inclinable with respect to the horizontal plane defined by the first and the second axis 420 and 420. The reference signal transmitter 440 is translational movable parallel to a third independent coordinate system axis 430, the third access 430 may be orthogonal to the horizontal plane.

The calibration environment 400 allows to determine correlation information indicative of a correlation between the position or the offset of the phase centre and different directions from which satellite signals are received when using, for example, the method 300 described with reference to FIG. 3.

During a calibration process, the antenna 470 receives reference signals from the reference signal transmitter 440. The received reference signals may have different reference frequencies. During transmittance and receipt of the reference signal, the transmitter 440 and the rotatable platform 450 both remain in known fixed positions. Based on the known fixed positions, a direction from which the reference signal is received by the antenna can be unambiguously determined. A receiver 478 comprised in the vehicle may determine the position of the phase centre associated with the received reference signal. As the geometric position of the antenna in the calibration environment is known, and offset of the position of the phase centre to the geometric position of the antenna associated with the direction from which the reference signal is received and/or the frequency of the reference signal can be determined and stored in a database, matrix or other storage means.

By rotating and declining the rotatable platform 450 and by moving the transmitter 440 parallel to the third axis 430, all directions from which a signal may be received within the northern hemisphere with respect to the horizontal plane can be assigned to a position of the phase centre or to an offset of the phase centre with respect to the geometric position of the antenna 470. In other words, each direction defined by an azimuth angle between 0° and 360° and an elevation angle between 0° and 90° with respect to an orientation of the antenna or the vehicle may be assigned to a position or an offset of the phase centre.

In operation, the phase centre determined by the receiver 480 arranged in the vehicle 460 may be influenced by other entities arranged in the vehicle 460 or by other signals received by the vehicle 460. As in the illustrated calibration environment, the antenna 470 is calibrated after being mounted to or arranged in the vehicle 460, these further influences are considered in the calibration process.

Similar to the set up in the calibration environment shown in FIG. 4, satellites of the GNSS may be used to perform calibration of the antenna. In one example, the vehicle may be situated at an accurately known position. In another example, the vehicle may accurately determine its position based on satellite signals that are received from directions already comprised by the correlation. Subsequently, the vehicle may receive satellite signals from a new direction that is not yet associated with the position of the phase centre in the correlation information. Similar to what is described with reference to FIGS. 3 and 4, vehicle may then determine a position or an offset of the phase centre associated with the new direction and add the respective determined dependency of the phase centre on the new direction to the collation information. In that manner, the correlation information may be updated or complemented during operation.

Figure 5:
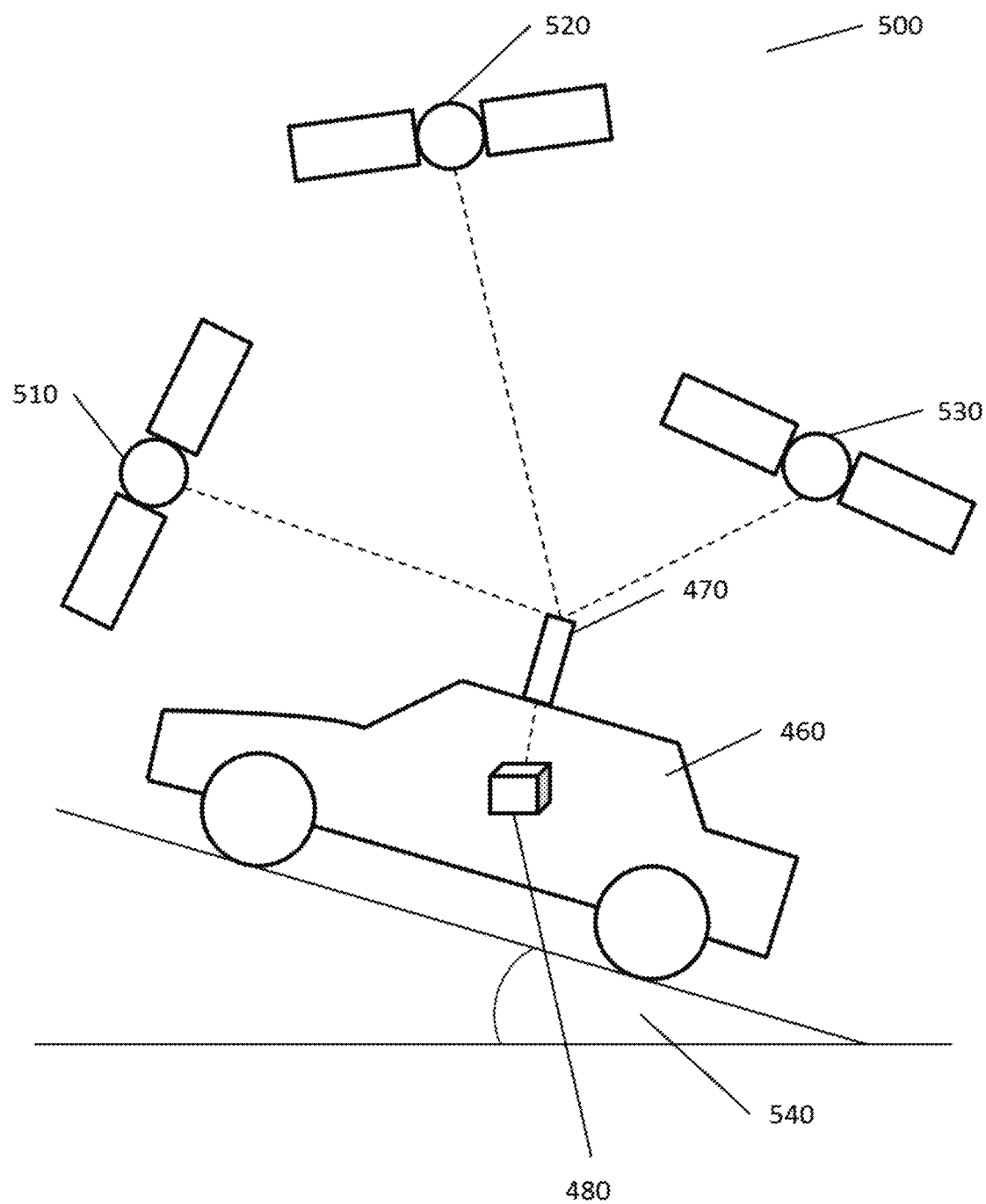
FIG. 5 shows a global navigation satellite system comprising multiple satellites and an antenna mounted on a vehicle.

FIG. 5 shows a global navigation satellite system 500 comprising satellites 510, 520 and 530. The system 500 further comprises the antenna 470 mounted on the vehicle 460. As illustrated, the antenna 470 receives satellite signals from each of the satellites 510, 520 and 530 from a respectively different direction. In the illustrated two-dimensional example, each direction from which the satellite signals are received, in particular the elevation angle depends on angle 540 that defines the inclination angle of the antenna in relation to the surface of the earth. The direction is further defined by the direction in which the vehicle is driving.

After having determined and stored correlation information indicative of a correlation between the position of the phase centre and different directions from which satellite signals are received, the receiver 480 comprised in vehicle 460 is enabled to take into account the direction from which satellite signals are received when determining the position of the vehicle or the geometric centre of the antenna 470 within the GNSS 500.

The invention claimed is:

1. A method for compensating an offset of a position of a phase centre of an antenna with respect to a geometric position of the antenna arranged in a mobile device, wherein the antenna is operable to receive satellite signals in a global navigation satellite system, the method comprising:
   receiving, with the antenna, satellite signals from satellites of the global navigation satellite system;
   determining a direction from which the satellite signals are received based on the received satellite signals; and
   determining the offset based on the direction from which the satellite signals are received and stored correlation information indicative of a correlation between the position of the phase centre and the direction from which the satellite signals are received.

2. The method according to claim 1, wherein determining the offset is further based on a frequency of the received satellite signals and the stored correlation information is further indicative of a correlation between the phase centre and the frequency of the received satellite signals.

3. The method according to claim 1, further comprising:
   determining an orientation of the antenna relative to the satellites;
   wherein determining the direction from which the satellite signals are received is based on the determined orientation of the antenna.

4. The method according to claim 3, wherein the orientation of the antenna is determined by an orientation determining device.

5. The method according to claim 3, wherein the orientation of the antenna is determined and stored repeatedly.

6. The method according to claim 1, further comprising:
   determining and storing, prior to receiving the satellite signals, the correlation information based on reference signals received from one or more reference directions at a reference geometric position of the antenna.

7. The method according to claim 6, wherein determining the correlation information is further based on one or more frequencies of the received reference signals.

8. The method according to claim 6, wherein determining the correlation information comprises:
   receiving, with the antenna, the satellite signals as the reference signals;
   determining a position of a reference phase centre of the antenna based on the received reference satellite signals;

obtaining the reference geometric position of the antenna;
comparing the determined position of the reference phase centre with the obtained reference geometric position.

9. The method according to claim 1, wherein the mobile device is a vehicle.

10. The method according to claim 4, wherein the orientation determining device is arranged in the mobile device.

11. The method according to claim 10, wherein the mobile device is a vehicle.

12. The method according to claim 5, wherein the orientation of the antenna is determined and stored continuously.

13. The method according to claim 5, wherein the orientation of the antenna is determined and stored periodically.

14. The method according to claim 4, wherein the orientation of the antenna is determined and stored repeatedly.

15. The method according to claim 14, wherein the orientation of the antenna is determined and stored continuously.

16. The method according to claim 14, wherein the orientation of the antenna is determined and stored periodically.

17. The method according to claim 7, wherein determining the correlation information comprises:

receiving, with the antenna, the satellite signals as the reference signals;

determining a position of a reference phase centre of the antenna based on the received reference satellite signals;

obtaining the reference geometric position of the antenna;

comparing the determined position of the reference phase centre with the obtained reference geometric position.

18. The method according to claim 4, wherein the orientation determining device is an inertial measurement unit.

19. The method according to claim 4, wherein the orientation determining device is a global positioning system device.

20. A positioning system comprising a mobile antenna operable to receive satellite signals in a global navigation satellite system, the positioning system being configured to carry out a method comprising:

receiving, with the mobile antenna, satellite signals from satellites of the global navigation satellite system;

determining a direction from which the satellite signals are received based on the received satellite signals; and determining an offset of a position of a phase centre of the mobile antenna with respect to a geometric position of the mobile antenna based on the direction from which the satellite signals are received and stored correlation information indicative of a correlation between the position of the phase centre and the direction from which the satellite signals are received.

* * * * *